Sept. 18, 1956      O. C. STAHL      2,763,316

METHOD OF MAKING A MULTI-LAYER BRAID-REINFORCED HOSE

Filed May 31, 1955      3 Sheets-Sheet 1

INVENTOR.
OSCAR C. STAHL
BY
D. Gordon Angus
ATTORNEY.

Sept. 18, 1956  O. C. STAHL  2,763,316
METHOD OF MAKING A MULTI-LAYER BRAID-REINFORCED HOSE
Filed May 31, 1955  3 Sheets-Sheet 2

INVENTOR.
OSCAR C. STAHL
BY D. Gordon Angus
ATTORNEY.

Sept. 18, 1956  O. C. STAHL  2,763,316
METHOD OF MAKING A MULTI-LAYER BRAID-REINFORCED HOSE
Filed May 31, 1955  3 Sheets-Sheet 3

INVENTOR.
OSCAR C. STAHL
BY
D. Gordon Angus
ATTORNEY.

United States Patent Office 2,763,316
Patented Sept. 18, 1956

2,763,316

METHOD OF MAKING A MULTI-LAYER BRAID-REINFORCED HOSE

Oscar C. Stahl, Los Angeles, Calif.

Application May 31, 1955, Serial No. 511,849

10 Claims. (Cl. 154—8)

This invention relates to reinforced hose, and to a method for its manufacture.

This is a continuation-in-part of Oscar C. Stahl application Serial No. 459,916, filed October 4, 1954, for "Method for Making Reinforced Resin Hose," now abandoned.

A two ply hose having an inner core and an outer layer as plies is described in Davis Patent 2,645,349. Such a hose is conveniently made of a resin compounded with a plasticizer and other additives. An advantage of such a hose is that the plies, while being fused together to form an integral hose, can still be individually formulated so that each ply can have the specific properties which are most suitable for the service conditions to which it is primarily subjected. For instance, the material for the inner core can be formulated to provide for maximum bursting strength and water resistance, while the material of the outer layer can be formulated to provide for best abrasion resistance and light stability.

It is sometimes desirable to provide additional mechanical reinforcement in resin hoses of this type, and some attempts have been made to place a braid between the core and the outer layer for this purpose. However, such a braid as heretofore placed between plies occasionally shows a tendency to break free and shift its position and thus tends to cut the outer layer from the inner core when the two should remain fused together. This tendency is most noticeable near the fittings at the end of the hose where the reinforcement is most needed. As a consequence of this braid shift, the hose will be considerably weakened.

In the manufacture of multiple layer hose, particularly of hose which is made of materials such as polyvinyl chloride and the like, which is commonly known as "plastic hose," considerable trouble is encountered by reason of air which becomes entrapped in the materials of construction. This entrapped air forms bubbles in the plastic material during the curing process and often results in an unnecessarily high rate of scrap production.

The problem of entrapped air is particularly serious in the manufacture of a multi-layer hose wherein a braid is placed between contiguous layers of a multiple layer hose. In one process for making such a hose, a braid is laid on the surface of an inner layer or core, and the next outer layer is applied by coating the braid-covered core with a liquid plastisol. The thickness of this outer layer is determined by wiping off excess plastisol, and then the hose is cured by means such as infrared radiation or a hot air blast. Fibrous braids have large surface areas and many interstitial spaces which entrap or adsorb gas molecules, and this gas, when released by the heat of the curing operation causes bubbles or holes in the outer plastisol layer. The outer layer is thereby rendered pocked and unsightly, and the hose must be rejected.

In addition it has been found that air in the hose braid prevents the braid from making a satisfactory joinder with the plies of resin. For a durable bond and a sound hose, the resin of both layers should coalesce with the outer surface of the braid and with each other, and any air present will bar the resin from making a sufficiently intimate contact with the braid to achieve such coalescence.

This invention may advantageously be carried out by use of apparatus similar to that shown in the Stahl Patent 2,626,426 wherein a plastic inner core or hose ply is extruded to form the central part of the hose, and wherein means are provided for coating the outer surface of this inner core to form the outer layer or hose ply.

It is an object of this invention to provide a method and apparatus for making plastic hose which diminishes, and usually prevents, air from spoiling the hose.

An additional object is to provide for the manufacture of braid reinforced plastic hose wherein the air can be removed from the braid so that the outer layers are not spoiled, and so that the braids and its adjacent hose layers can all be mutually and firmly bonded together.

An optional object of this invention is to provide for the manufacture of a multiple-layer hose having a treaded outer surface for minimizing abrasive damage when the hose is dragged along a surface.

According to one feature of the invention, a hose core which forms a layer of the multiple layer hose is passed through a vacuum chamber to remove the air from surfaces thereof. A plastisol covering for this core may be applied to the core so as to form the outer layer either before or after the core is passed through the vacuum chamber. The hose is thereafter passed through a wiper die to define the dimensions of the outer layer, and then the hose is cured to make it a flexible solid structure.

According to a preferred but optional feature of the invention, an inner hose core has a braid applied thereto, and the braid-covered core is then immersed in liquid plastisol, some of which adheres to the core. The inner core with its braid and adherent plastisol is next passed through a vacuum chamber so as to de-air the core, braid, and plastisol. Thereafter, the hose is passed through a wiper die and a curing device so as to define the outer diameter and to cure the hose.

A preferred but optional means for exposing the hose to a vacuum resides in a U-shaped conduit having its two legs immersed in the plastisol reservoir. A vacuum is created at the bight of the U. Preferably, although not necessarily, the legs are sufficiently long that the vacuum does not pull the plastisol up into the bight of the U. There will then be an extended region of sub-atmospheric pressure through which the core passes for the removal of air from its surface, from the braid, and from the outer plastisol covering.

Another optional feature of the invention resides in heating the hose after application of the braid so that the inner core is caused to protrude between the strands of braid to create a treaded surface on the outside of the hose.

Another optional feature of this invention resides in plaiting a braid onto the outer surface of the inner core, and wetting the braid with a plasticizer prior to the application of the outer layer. After the braid has been laid on the inner core and wetted, the outer layer is applied so as to cover both, and the resulting two-ply reinforced structure is thereafter cured according to conventional practice to form a plastic resinous structure.

Another optional feature allied to the feature next above resides in heating the plasticizer, and thereby the braid and inner core so as to aid in further deairing of the materials. Heat may also be applied to the plasticizer-coated braid-covered inner core for this purpose before the application of material for the outer layer.

Still another optional feature of the invention resides in a wiper die having a wiper orifice for determining the quantity of plastisol which is to be left on the braid-covered core, and a reservoir immediately adjacent said wiper orifice which contains plastisol for assuring a constant supply of plastisol at said orifice. This wiper die enables a hose to be manufactured having an outer layer of fairly uniform thickness, and which conforms to and maintains the surface configuration of the inner layer, even when said surface configuration is irregular.

The above and other features of this invention will be fully understood from the following detailed description and the accompanying drawings, of which:

Figure 3:
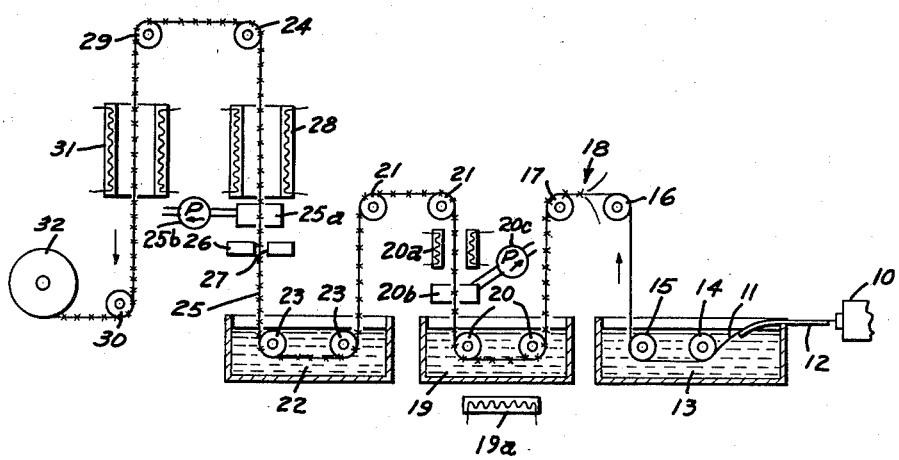
Fig. 3 is a schematic drawing showing one means according to the invention for producing the hose in Fig. 1.

In Fig. 3 there is shown the cross-head 10 of a conventional extruder for producing a cylindrical inner core 11 made of a thermoplastic resin formulation. This inner core is formed under pressure and heat in a manner well-known in the art, and is received from the cross-head and carried by a slide 12 into a water bath 13 where it is cooled to room temperature. Rollers 14, 15 serve to hold the inner core submerged in the water bath. After cooling, the inner core is lifted from the trough by means of a driver wheel 16 from which it proceeds horizontally toward another drive wheel 17.

Between wheels 16 and 17 a braid 18 is applied to the inner core by any desired means. Braiding equipment is well-known in the art, and since the mechanism for plaiting the braid forms no part of this invention, it will not be further discussed here. The braid material may advantageously comprise nylon cord, although any other flexible substance such as cotton cord could also be used. The cord for this braid will preferably be somewhat porous.

The braid-covered inner core is next passed into a second bath 19 in which it is held submerged by means of rollers 20. Heaters 19a may be provided to heat this bath to aid in de-airing the surface of the inner core and the braid. Similar heaters 20a may be provided above the bath 19 so as to heat the plasticizer wetted inner core and braid surfaces and further aid in de-airing them. This bath 19 contains a plasticizer later to be described. The residence period of the braid-covered inner core in the second bath 19 will depend on the fluidity of the plasticizer, and on the porosity of the braid. Generally speaking, so long as the surface of the braid is covered by plasticizer, the residence period need not be of great duration, since sufficient time for the necessary permeation of plasticizer into the braid material will pass while the inner core is in transit to the next operation.

A vacuum chamber 20b may be provided so as to exert a vacuum around the core after it leaves bath 19 to further de-air the braid and core. A pump 20c serves to evacuate air from the vacuum chamber. This chamber and the other vacuum chambers shown in the drawings may be of any desired construction, their structural details forming no part of the invention.

The plasticizer-soaked braid-covered inner core is removed from bath 19 by means of rollers 21 and conveyed to a third bath 22 in which it is held submerged, and is guided by means of rollers 23. This bath contains a plastisol formulated of resin, plasticizer, and other additives, which will be described below in greater detail. This plastisol will produce the outer layer or hose ply 23a which will surround and cover the braid-covered inner core. A drive wheel 24 serves to lift the inner core out of the third bath 22. The consistency of the plastisol is such that it will adhere to the outer surface in an amount in excess of that which is required for producing the outer layer.

The braid-covered inner core, now coated with excess plastisol, rises vertically out of the third bath as indicated by the numeral 25 and passes through a wiper die 26 and then may be run through a vacuum chamber 25a which is evacuated by pump 25b. This wiper die is a rigid collar with a circular orifice 27 which is larger than the outer dimensions of the braid, and serves to remove from the inner core all but the precise amount of plastisol necessary to produce the outer layer. The inner diameter of this orifice is therefore approximately that of the desired hose outer diameter. At this point in the process, the hose materials are all properly distributed, and need only to be cured to form the final resinous plastic product.

Above the wiper die there is disposed a battery of heaters 28 for curing the hose. These heaters may be of a conventional infrared type, or they may be of some other kind, such as hot air blowers. They should produce a surface temperature of approximately 350° F. on the hose surface. From the drive wheel 24 the hose is conveyed by further drive wheels 29, 30 sidewardly and then downwardly through a second battery of heaters 31. From the wheel 30, the hose may be collected on a take-up reel 32 and thereafter cut to any desired length.

Figure 4:
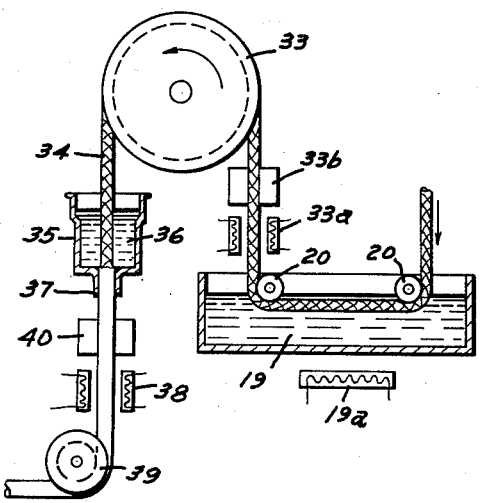
Fig. 4 illustrates an alternate means for applying the outer layer to the hose.

In Fig. 4 there is shown another apparatus for applying the outer layer to the braid-covered inner core. This apparatus may be substituted for that part of the apparatus of Fig. 3 which is shown therein to the left of the seiond bath 19. That is, after the braid-covered inner core is dipped into the bath of plasticizer, it can be conveyed directly to the apparatus of Fig. 4. Thus this dispenses with the third bath 22, and with the wiper die 26.

This alternate coating means takes the plasticizer-wetted inner core from the second bath 19 by means of a drive wheel 33 through a heater 33a and a vacuum chamber 33b. The vacuum chamber is evacuated by pump 33c. From the drive wheel, the core moves vertically downward as arm 34 through a pot 35 which contains a plastisol 36 which is suitable for forming an outer layer on the inner core. This plastisol is the same material as that contained in bath 22 in the apparatus of Fig. 3. A wiper die 37 is provided at the bottom of the pot through the orifice of which the arm 34 of the core passes. The diameter of the orifice in this die is substantially equal to the desired outer diameter of the outer layer to be applied by this apparatus. This wiper die permits only the amount of plastisol needed for making the outer layer to pass from the pot with the hose. This die also serves to shape the plastisol so as to form the desired generally cylindrical outer surface for this multi-ply hose. The hose is further drawn downward by a drive wheel 39 through vacuum chamber 40 and a battery 38 of heaters such as infrared or hot air heaters which are disposed beneath the pot 35.

Figure 2:
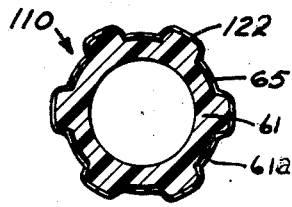
Fig. 2 is a cross-section taken at line 2—2 of Fig. 1.
Figure 1:
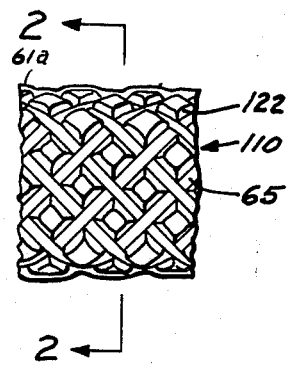
Fig. 1 is a cut-away view in perspective of a piece of hose which can be produced by the methods of this invention.

Figs. 1 and 2 show a multi-ply hose product which results from the apparatus of either Fig. 3 or 4. As will be noted from these drawings, the inner core 61 and outer layer 61a are fused and coalesced with each other and form a substantially homogeneous, integral two-ply hose in which the braid is held firmly between the inner core and outer layer. A certain amount of the resin may be expected to permeate at least the outer pores of the braid, although there is no convenient means for illustrating this feature in the drawings.

Figure 6:
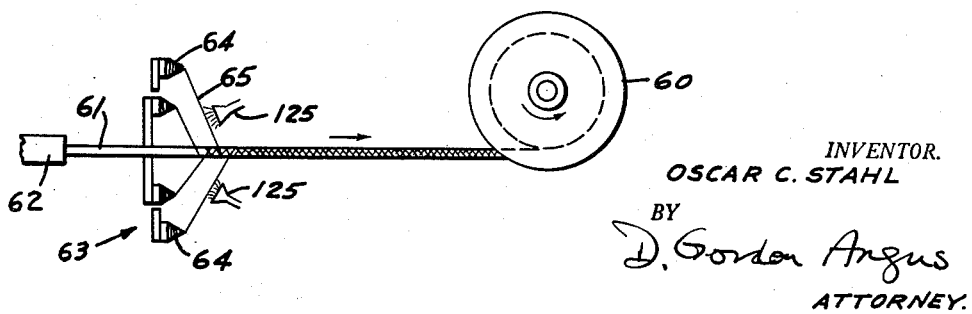
Fig. 6 is a side view, partly schematic, of a means for creating the inner core of a plastic hose, and for plaiting a braid thereon.

In Fig. 6 there is shown an optional point for wetting the braid with plastisol. Nozzles 125 are shown for this purpose although vats and the like would be equally useful. If wetted in this manner, the hose need not be passed through reservoir 19, although said reservoir still might be desired for its additional effect.

Figure 5:
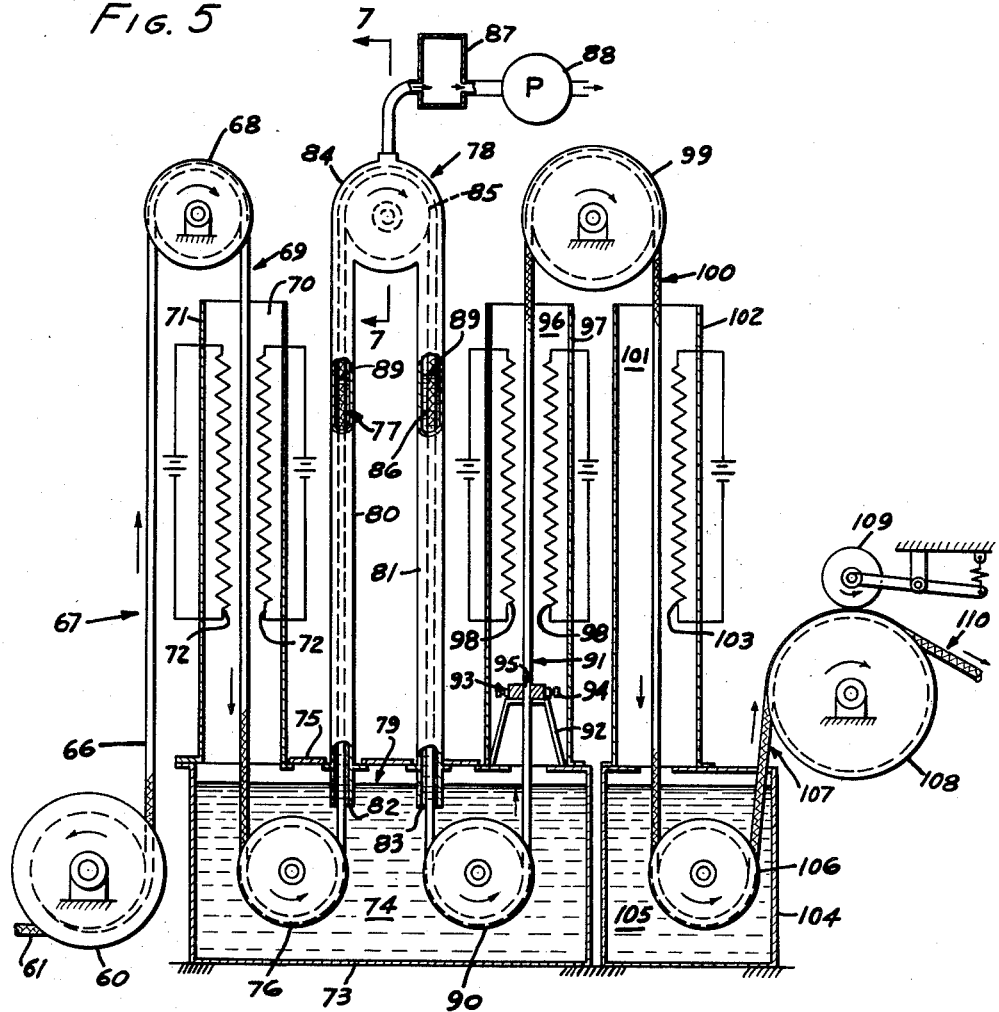
Fig. 5 is a side elevation, partly in cutaway cross-section, of a hose manufacturing apparatus according to the invention.

In the apparatus of Fig. 5, a supply reel 60 acts as a source of a cylindrical tubing 61 of indefinite length, which tubing comprises the inner core, or layer, of a multilayer hose which is to be manufactured by the apparatus of Fig. 5. Such an inner core 61 is conveniently extruded, as shown in Fig. 6, from a conventional screw type pressure extruder having a cross-head 62. As is well known in the art, cross-sections of many configurations can be obtained by the use of such cross-heads. This disclosure will relate to the manufacture of a hose using a smooth cylindrical inner core. However, it will be understood that other cross-sections of tubing could also be utilized.

The inner core passes through a conventional braiding device 63. This device has a plurality of spools 64 of braid material 65. By appropriately rotating the spools around the core, and desired braid pattern, such as the diamond shaped pattern shown in Fig. 1, can be created. For purposes of this disclosure, a diamond-shaped braid pattern will be discussed throughout, it being understood that other braid patterns are also attainable, and also that a woven hose is contemplated as well as a braided hose. The term "braided" is used herein to denote a pattern of crossed strands, regardless of the orientation of said strands. Nozzles 125 are shown discharging plasticizer upon the braid as an aid in de-airing. With the use of the machine of Fig. 5, this plasticizer de-airing will often be found unnecessary.

After the inner core has had the braid applied thereto, it may either be run upon a supply reel 60 in convenient lengths, say of 1000 feet, or may simply be deflected over these supply reels, using the reel as a pulley, and passed directly into the apparatus of Fig. 5 as shown.

Therefore, it will be understood that the extruder 62 forms no part of the invention, since the invention in any of its forms may be practiced by utilizing inner cores which may or may not be manufactured concurrently with the operation of the coating and de-airing apparatus. In fact, an advantage of this invention is that the braid-covered inner core can be stored in convenient lengths on reels and does not acquire a permanent set. This permits hose making machinery to be operated semi-automatically, instead of continuously, with a considerable saving in plant overhead.

The braid covered inner core 66 passes from the supply reel 60 in an upwardly bound arm 67 to a first driven pulley 68 which directs the braid covered core into a downwardly directed arm 69.

The downwardly directed arm 69 passes through a pre-heat chamber 70 inside a cylindrical jacket 71. Any convenient heating means may be provided in this pre-heat chamber, electrically operated infrared heaters 72 being an illustrative and preferred example. The temperatures to be utilized in this pre-heat chamber, and the results effected thereby will be further discussed below.

From the pre-heat chamber, the downwardly bound arm 69 passes into a reservoir 73 which is filled with a plastisol 74 of the type to be further discussed below. Removable covers 75 may be provided over the open portions of the reservoir so as to exclude dust therefrom. The downwardly bound arm 69 is led over a submerged driven pulley 76 which is journaled to the side of the reservoir, and this pulley wheel 76 directs the inner core, which is now covered with plastisol due to its immersion in the reservoir, into an upwardly bound arm 77.

The upwardly bound arm 77 enters a vacuum apparatus 78, the entrance and exit of which are disposed beneath the surface 79 of the plastisol in the reservoir. This vacuum apparatus comprises a generally U-shaped structure having two legs 80 and 81 which have open lower ends 82 and 83, respectively, which are disposed below the surface of the plastisol. These tubular legs are tightly fitted to a closed cylindrical drum 84 (the "bight" of the U). The legs, the drum, and all joints are hermetically sealed against leakage.

A driven pulley 85 is fitted inside the drum over which the upwardly directed arm 77 passes to be deflected down again as downwardly directed arm 86. A vacuum accumulator 87 is connected to the drum, and a vacuum pump 88 maintains a vacuum within the accumulator and drum. The maintenance of the vacuum in the drum will draw plastisol from the reservoir 73 up into the legs 80 and 81 to a level on each leg indicated by the numeral 89. The height of this level 89 above the reservoir level is, of course, dependent upon the specific gravity of the plastisol and also upon the degree of vacuum maintained within the drum 84. Preferably, although not necessarily, the legs 80 and 81 are made sufficiently long that a high degree of vacuum can be maintained in the drum without pulling the level 89 up into the bight of the U, i. e. into the drum itself. By this means, a continuous region of progressively diminishing pressure is created above the level 79 of the plastisol in reservoir 73, within legs 80 and 81, and within the drum.

The hose leaves the vacuum device 78 at the bottom end 83 of leg 81, and proceeds around submerged driven pulley 90 to upwardly bound leg 91. As the plastisol-covered inner core leaves the pulley 90 it is completely covered with plastisol, and the air will have been removed from the surface of the inner core, from the braid, and from the plastisol which is closest to the braid and the inner core. Air in the small amount of plastisol picked up at pulley 90, and not later removed by the wiper die, has not been found to be troublesome.

Upwardly bound leg 91 passes through the center of a table 92 upon the top of which is disposed a wiper die 93 to be described in further detail below. This die is shiftably held to the table by means of adjustable clamps 94 so that the die can be adjusted so as to be centered on the upwardly bound arm 91 of the hose. The wiper die 93 has a central orifice 95 which serves to wipe off plastisol from the surface of the braid covered inner core in excess of that needed for an outer layer of the desired thickness. The correctly dimensioned hose then proceeds upwardly into a curing chamber 96. This curing chamber conveniently comprises a tubular jacket 97 within which are disposed heating elements 98 which may be such as infrared heaters if desired.

The upwardly bound arm 91 passes from the curing chamber 96 over a drive pulley 99, which deflects the hose into a downwardly bound arm 100, and into and through another curing chamber 101 which comprises a jacket 102 and heaters 103.

After leaving the curing chamber 101 the hose passes downwardly into a reservoir 104 which is filled with water 105 for cooling the hose core. A driven pulley 106, journaled in the wall of the reservoir 104, directs the hose in upwardly bound arm 107 toward a driven pulley 108 to which it is frictionally held by a spring loaded idler pulley 109. Thereafter, the completed hose 110 is directed to any desired storage means.

Figure 7:
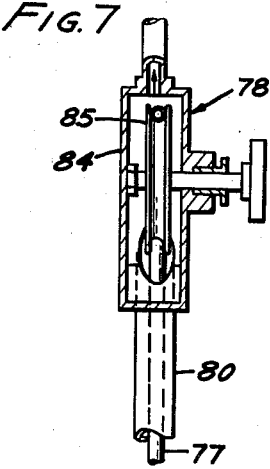
Fig. 7 is a fragmentary view, partly in cross-section, taken at line 7—7 of Fig. 5.
Figure 8:
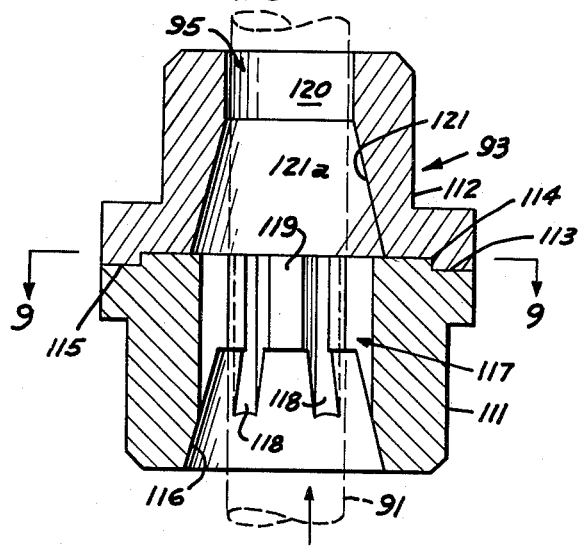
Fig. 8 is a cross-sectional elevation of the wiper die shown in Fig. 5.
Figure 9:
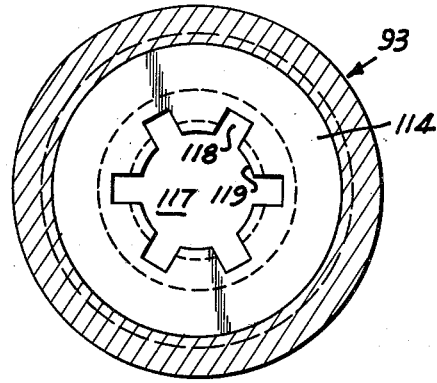
Fig. 9 is a cross-section taken at line 9—9 of Fig. 8.

In Figs. 8 and 9 there is shown a construction for a wiper die 93 which is well-suited for the manufacture of hose of an irregular surface contour. As an illustration of one such irregular surface contour, the diamond-treaded hose 110 which is produced according to the process of Fig. 1 is shown in Figs. 1 and 2.

This wiper die 93 is conveniently provided in two parts:

an initial section 111 and a final section 112. These two sections are joined at a parting line 113 by means of a boss 114 on the initial section and an annular shoulder 115 on the final section, which surrounds and fits to the boss.

With specific reference to the initial section 111, there is provided a frusto-conical sloped chamber 116, which tapers toward a throat 117. The throat 117 has axial slots 118 out in its walls so as to leave lands 119 therebetween. The diameter of the throat as defined by the inner surface of the lands is slightly larger than the outer diameter of the inner core plus the braid thickness. This throat thereby aligns the hose in the wiper die with greater accuracy than is attainable by simply aligning the upper and lower pulleys 90 and 99. The slots 118 permit an excess of plastisol to be carried along on the surface of the hose, and should be of such depth that the plastisol which is pulled through them by the hose is in excess of that needed to form the desired outer layer, when added to the plastisol which passes inside the lands 119.

The final section 112 of the wiper die has an orifice 120 at the top thereof with a diameter of such a size that it removes all but just sufficient plastisol on the hose to constitute an outer layer of the desired thickness. During the curing operation, the plastisol flows to create a jacket of substantially uniform thickness over the entire surface of the hose, and which maintains the surface configuration of the inner core.

To enable plastisol to be distributed evenly over the surface of the inner core, a counterbore 121 is provided below orifice 120 which tapers into and joints with said orifice 120. Thus throat 117 and orifice 120 comprise central orifice 95. It will be observed that when the initial and final sections of the wiper die are joined, a reservoir 121a is formed within the counterbore 121, between the throat and the orifice 120. Plastisol carried by the hose through the slots 118 fills the reservoir 121a, and this reservoir assures a steady supply of plastisol at the wiper die orifice 120 to form the hose surface. In this manner, the wiper die as shown is capable of providing the correct amount of plastisol to the surface of the hose for creating the desired outer jacket. Furthermore, the provision of the reservoir directly adjacent orifice 120 permits hose of irregular contour to receive a coating of uniform thickness. The reasons for this performance are not presently completely understood, but the improvement in hose manufactured utilizing a wiper die with such a reservoir over hose manufactured using a simple orifice ring without a reservoir is marked, particularly when a hose with an irregular surface is made. The braid alone makes a sufficiently irregular hose surface that the use of such a reservoir is advantageous.

The wiper die of Figs. 8 and 9 is shown as having six slots 118. It will be appreciated that more or fewer of these slots can be provided. However, six slots have been found to make an optimum die for carrying out this hose manufacturing operation.

In order to produce the most useful hose, the inner core and the outer layer will preferably be separately formulated so that each will possess specific properties most suitable to the service conditions each will encounter. For example, the inner core will often preferably have a higher burst strength and water resistance, while the outer layer will often be formulated for sun resistance and abrasion resistance.

The resins useful for making the inner core and outer layer of this hose are substantially the same. Different additives will be supplied to these resins to make a formulation which will provide the different specific properties. The resins for these plies are included in that class of resins made by polymerization or copolymerization of monomeric ethenoid compounds having the vinyl configuration:

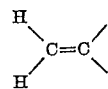

The most important members of this class of monomers are those with the vinyl radical:

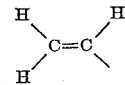

such as vinyl chloride, and vinyl acetate. These polymerize to form the resinous polyvinyl chloride, and polyvinyl acetate respectively. The copolymer of polyvinyl chloride and polyvinyl acetate is also useful (that is to say, the co-polymer of vinyl chloride and vinyl acetate). Other important monomer members of the class are the vinylidine compounds which also possess the vinyl configuration, such as vinylidine chloride:

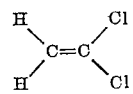

which polymerizes to form a resin. Also useful are the copolymers of vinylidine chloride, and vinyl chloride or vinyl acetate.

Thus, speaking generally, the resinous substances may conveniently be selected from the group consisting of polyvinyl chloride, polymerized vinylidene chloride, polyvinyl acetate, the co-polymer of vinyl chloride and vinyl acetate, the copolymer of vinylidine chloride and vinyl chloride and the copolymer of vinylidene chloride and vinyl acetate.

These resins are of a type which can be formed into plastic articles when compounded with substances known as plasticizers, by applying appropriate heat or pressure, or both heat and pressure. The resinous material for the inner core, which will be formed by extrusion requires heat and pressure for the formation of a plastic article, and will be of a higher molecular weight than the resinous material for the outer layer which is applied as a plastisol and requires only heat for the formation of the plastic outer layer.

The plasticizers for use with these resins ordinarily fall into four general classes: esters, hydrocarbons, chlorinated hydrocarbons, and others. Typical examples of the esters are dioctyl phthalate, tetrahydrofurfuryl oleate, and tricresyl phosphate. Typical of the hydrocarbons is a partially hydrogenated mixture of isomeric terphenyls. Typical of the chlorinated hydrocarbons is a mixture of chlorinated bi-phenyls, or a mixture of chlorinated diphenyl benzenes, or of both. Typical of the others are bis-(alpha methyl) ether, and benzyl, ether.

It will be recognized that the term plasticizer includes all substances which will serve to plasticize resins of the above mentioned class so as to permit an article to be formed from them, and also includes many substances occasionally classified as "adhesives" in the plastic trade. There is no known generic classification for such plasticizers, however, and the term plasticizer as used herein is intended to include all those compounds physically able to plasticize the resin, and which is compatible with the resin of the inner core and outer layers.

The plasticizer used in the bath 19 may conveniently be the same as that which will be used for the compounding of the resins for the formation of an article. This is not a necessary limitation, however, for any plasticizer compatible with the resin formulation in the core and the outer layer will be satisfactory for use in the bath 19.

The following is an example of a formulation satisfactory for making the inner core. The resin comprises 100 lbs. of granulated polyvinyl chloride of the type customarily used for extruding into tubing. The particle size is such that 100% passes 42 mesh, 50% is retained on 100 mesh, and 50% is retained on 200 mesh. This resin has an average molecular weight of about 100,000. To this resin will be added the following:

30 lbs. di-capryl phthalate
10 lbs. dibutyl phthalate
10 lbs. of a high molecular weight, aromatic petroleum hydrocarbon extender
30 lbs. chalk filler
1 lb. carnauba wax The two phthalate compounds act as plasticizers. The carnauba wax imparts water resistance to the hose.

As an example of a plastisol formulation suitable for making the outer layer, 100 lbs. of polyvinyl chloride resin with a particle size of approximately 1 to 1½ microns, and an average molecular weight of about 60,000, can be mixed with the following plasticizer formulation:

20 lbs. di(2-ethyl hexyl) phthalate
20 lbs. di(2-ethyl hexyl) sebacate
10 lbs. di(2-ethyl hexyl) azelate
10 lbs. di-benzyl sebacate
20 lbs. di(2-ethyl hexyl) adipate The di(2-ethyl hexyl) sebacate, di(2-ethyl hexyl) azelate, and di-benzyl sebacate impart permanent flexibility because of their extremely low volatility, and improve the low temperature flexibility and resistance to cracking. The di(2-ethyl hexyl) adipate imparts good low temperature flexibility as well as good light stability.

The following materials may also be added to impart specific properties to this outer layer:

1 lb. dibasic lead stearate
3 lbs. dibasic lead phthalate
2 lbs. barium ricinoleate
0.5 lb. lead salicylate
0.1 lb. titanium dioxide (TiO$_2$)

The dibasic lead stearate and barium ricinoleate function as heat stabilizers and impart improved surface finish. The dibasic lead phthalate acts as a light stabilizer, and the lead salicylate as a light screen. The titanium dioxide is a white pigment which acts as an opacifier.

The latter formulation may be intimately mixed to form a smooth plastisol by use of a 3-roll paint mill, and a viscous fluid dispersion of the resin and the additives results which can easily be spread over the surface of the inner core.

This plastisol formulation provides an excellent surface finish, excellent surface properties, particularly with respect to abrasion and weather resistance, permanent color, good resistance to cracking, particularly at low temperatures, and permanent flexibility and light stability.

Occasionally it may be desired to further improve the surface polish of this coating in which event a quantity of a volatile organic vehicle such as toluene may be added to the above formulation. This plastisol with the added volatile ingredient is sometimes known as an "organosol." When this organosol is exposed to heat, the volatile ingredient evaporates, leaving behind the plastisol. The plastisol then proceeds to form the plastic coating as though the volatile ingredient had never been present. However, a glossier surface will be formed than that obtained when the volatile ingredient is not used.

The plasticizer for the baths 19 may conveniently consist of di-octyl phthalate, or if preferred, a mixture of plasticizers may be used such as the following:

20 lbs. di(2-ethyl hexyl) phthalate
20 lbs. di(2-ethyl hexyl) sebacate
10 lbs. di(2-ethyl hexyl) azelate
10 lbs. di-benzyl sebacate
20 lbs. di(2-ethyl hexyl) adipate which is the plasticizer used in the above-described plastisol formulation for the outer layer.

There are numerous other useful and desirable formulations of ingredients. The ingredients will vary both with the resins utilized, and with the specific properties desired for the hose plies. Therefore the above formulations for the inner core, the outer layer, and for the plasticizer bath, are given simply as useful examples for producing a satisfactory two-ply reinforced hose, with no intention of limiting the generality of this invention.

Further examples of suitable formulations for plastic hose, and other additives to enhance certain properties of the hose may be found in the United States patent to Elbert Davis and Oscar C. Stahl, Number 2,645,249, issued July 14, 1953.

In the operation of this process, using the apparatus of Fig. 3, the inner core is formed by the extruder, and is received from the cross-head 10. Of course, it will be appreciated that this inner core could have been made elsewhere, and then simply be drawn from a reel and introduced to this coating and braiding process. The inner core is hot when extruded, and will therefore be conveyed to the cooling bath 13, where it is left in residence long enough to cool to room temperature and thus harden in its tubular shape.

The braid is thereafter plaited onto the inner core, and the structure is next dipped into the plasticifier. The residence period in the plasticizer bath need be only long enough to wet the surface of the braid, and this period will depend upon the surface-active properties of the plasticizer as well as the porous nature of the braid surface. Generally an immersion of a few seconds' duration will be adequate. By heating this second bath 19, there is an enhanced tendency for air to escape from the surface of the braid and of the inner core. After removal from bath 19, vacuum chamber 20b and heaters 20a serve to remove more air by evacuation and expansion, respectively, from the same surfaces.

After removal from the plasticizer bath 19, the braid covered inner core is submerged in the plastisol bath 22 for a few seconds. A quantity of plastisol in excess of that required for the outer layer clings to the surface of the inner core. Of course, the viscosity of the plastisol must be high enough that such a quantity will remain on the core. This is a matter of experimentation and is largely determined by the proportion of liquid plasticizer in the plastisol.

The excess plastisol is wiped off the hose as it passes through the wiper die, and flows down the arm 25. This additional quantity on the hose assures an adequate supply of plastisol at the wiper die at all times. The die permits only the exact amount of plastisol to pass which is needed for the outer layer, and in addition serves to create the desired cylindrical outer surface for the hose. Because the plastisol remains fluid until it is heat-cured, the arm 25 will be disposed vertically so as to retain the uniform distribution of material effected by the wiper die.

After the die has determined the quantity of plastisol which will form the outer layer, the hose may be passed through the vacuum chamber 25a for further de-airing and then through the heaters 28. These heaters 28 cause the plastisol to congeal or cure and form the desired tough plastic. The temperature of the plastisol will be raised to approximately 350° F. for the period necessary to cure this outer layer. The temperature may be higher or lower, being selected for the optimum curing speed and the minimum degradation of the resin due to temperature. The residence time in the heaters will vary with the thickness and composition of the outer layer, and will also vary depending on the temperature used. The temperature of 350° F. appears to be an optimum temperature, and it has been found that the residence time for many coatings is approximately 30 seconds. These temperature and time values are given as an example, and not as a limitation, since they may have a wide range, still effecting the desired curing of the plastisol.

For convenience in lay-out of the apparatus, and to enable the linear speed of the hose to be kept at a fairly high speed while still maintaining residence time in the heaters, the additional heaters 31 may be provided in a downward arm to complete the curing. The apparatus may then be fitted into a room of ordinary height.

The apparatus of Fig. 4 provides a somewhat different means for applying the plastisol for the outer layer from that shown in Fig. 3. In this embodiment, after the braid-covered inner core has been dipped in the plasticizer tank 19, it is carried upwardly to a level above pot 35, and then is lowered therethrough. The orifice of the wiper die in the bottom of the pot 35 serves to determine the quantity of plastisol which remains on the core to form the outer layer, and presence of excess plastisol in the pot assures an ample supply. The outer layer is cured in the same manner as in the embodiment of Fig. 3, by passage through the battery of heaters 38. Heaters 33a, and vacuum chambers 33b and 40 aid in de-airing the various surfaces as described in connection with the apparatus of Fig. 3.

The apparatus of Fig. 3 for applying the plastisol for the outer layer and removing the excess has been found to be more satisfactory than that of Fig. 4, inasmuch as the heating element may be placed above the wiper die. Since the heat rises away from the die in this arrangement, there is no tendency for the plastisol to cure in the die orifice 27 and thereby reduce the orifice diameter. Occasionally the heat rising from the battery of heaters 37 in the apparatus of Fig. 4 will partially cure the plastisol in the die orifice and reduce its diameter, or even partially cure the plastisol in the pot and reduce its fluidity. However, both techniques for application are satisfactory and either can be used as desired.

When commonly utilized braid materials are used, the braid material 65 on the inner core does not expand appreciably when the inner core is heated. However, the inner core does expand with heat, so that the inner core expands between the webs of the braid to form raised diamond shaped lands 122 on the surface of the hose. This effect can be augmented by utilizing braid materials which shrink during the curing process.

Depending on the constituents of the plastisol used to form the outer layer, the inner core and braid may be rendered visible by making the outer layer of transparent material. Alternately, the outer layer may be made opaque, so that the only hose design simply comprises the treaded surface of the outer layer.

For the manufacture of a hose having an inner core of an inner diameter of .500 inch, an outer diameter of .700 inch, and a maximum wall thickness of .100 inch, a nylon yarn thickness (as laid) of .005 inch, and an outer layer .005 thick, it has been found advantageous to operate the apparatus of Fig. 5 at a rate of from 20–23 feet of hose per minute. The pre-heat chamber 70 provides preferably approximately 10 feet of length in which the hose is exposed to heat, and the curing chambers will preferably total approximately 28 feet of curing length. Therefore, the residence time of an individual portion of the hose will be approximately 25 seconds in the pre-heat chamber, and approximately one and one half minutes in the curing chambers.

The pre-heat chamber in Fig. 5 will be maintained at approximately 100° F., which is sufficient to drive moisture and adsorbed gases from the surface of the inner core, and air out of the interstices of the braid, without causing the inner core to stretch excessively. Excessive stretching occur if the core is heated much higher than 100° F. in the pre-heat chamber.

The curing chambers in Fig. 5 are preferably maintained at 350–375° F., at which temperatures the outer layer of plastisol will be cured, and certain structural changes will occur in the inner core, which will be further described below.

Pump 88 in Fig. 5 will be operated to maintain a low vacuum, which will preferably be as low as or lower than one of two inches of mercury. When plastisol having a specific gravity of approximately 1.2 is used, it will be drawn up perhaps ⅔ of the height of the legs 80 and 81, leaving a region within the drum and at the top of the legs which is substantially evacuated, into which the air drawn from the braid, inner core, and plastisol can be discharged. Legs 80 and 81 may conveniently be approximately 12 feet long.

When an inner core without a braid on its surface is exposed to the temperatures used in this process, it will be found that it shrinks approximately 1½ inches per 12 inches of length. The outer diameter increases slightly, and the wall thickness of the tube also increases. If a non-shrinking braid such as a glass fiber braid is applied to the surface of the inner core, it will be found that when the hose is cured, the outer diameter of the hose does not materially increase, although there is a small protrusion of the outer core through the web of the braid. The tube will shorten somewhat, and the wall thickness will increase.

When a braid substance is used, such as nylon yarn, which shrinks during the curing process, the braid itself shrinks into the surface of the inner core when the hose is cured, and this augments the protrusion of the inner core through the braid so to create the raised lands 122 by a combination both of the shrinking of the nylon yarn, and also of the normal small amount of expansion of the tube. Nylon yarn shrinks by approximately 2 inches per 12 inches of length in the curing process. Therefore, in curing, the wall thickness of the tube increases, and the length of the inner core diminishes. It has been found that the inner core with nylon yarn contracts approximately 1½ inches per 12 inches of its length, while raised lands 122 are created.

Therefore, although by appropriately heating a hose with a braid on the surface, the diamond treaded configuration as shown in Figs. 1 and 2 will result even with a non-shrinking braid, the effect is augmented when a braid material is used which shrinks during the curing process.

Although the vacuum may be exerted at various locations in the system, it has been found preferable to remove the air in two stages, first by heating in the pre-heat chamber, and second by vacuum within the vacuum device 78 as shown in Fig. 5. It appears that de-airing the plastisol directly adjacent the inner core by means of the device 78, gives most advantageous results, and improved product.

The process as illustrated in Fig. 5 removes air from the inner core, the braid, and the plastisol close to the braid. It has been found that the vacuum device 78 alone is sufficient for this purpose, but that the preheating improves the product noticeably. While plastisol picked up in the reservoir while the hose passes around pulley 90 will have some air, it will be appreciated that this additional plastisol is most apt to be removed from the hose by the wiper die. Furthermore, the heat from the curing operation will drive off air close to the surface of the hose while the plastisol is still sufficiently fluid to flow over and cover any blemish which might result from the expulsion of a bubble of air close to the hose surface. The primary difficulty from entrapped air has been caused by that air which was entrapped so close to the inner core, that by the time it was driven from the surface on which it was adsorbed and started toward the surface of the hose, the outer layer was cured and solidified, and the bubble became trapped in the outer layer to form an unsightly flaw.

The height of the lands developed in this process depends principally upon the temperature in the curing chambers and the residence time therein. It has been found that a minimum of 350° F. is necessary for best results, and of course the upper temperature is restricted by the fire hazard involved. Generally speaking a residence time of 1½ minutes at a temperature between 350° and 375° F. gives optimum results.

It has been found that the process of pre-heating the hose in pre-heat chamber 70 results in substantially de-airing the surface of the inner core and the braid surrounding it. To prevent excessive stretching of the hose, it is undesirable to heat the hose any more than necessary, and therefore only a slight tread is formed on the outer surface of the inner core in the preheat chamber.

Heating methods other than infrared radiation may of course be utilized. However, the use of infrared radiation materially cuts down the curing time and accordingly permits the machines to be operated at a higher rate of speed.

It will be understood that with any of the embodiments shown herein, the source of the inner core may be an extruder disposed in line with the rest of the equipment, or may simply be a reel of previously-formed core. The source of braid-covered inner core may also be other than as shown. For example, instead of plaiting the braid onto the already-extruded inner core, another well-known process is to provide a "tube" of braid, and insert the inner core therein. The method or technique of obtaining the braid-covered inner core forms no part of this invention, and therefore any appropriate means may be utilized to provide such a braid-covered core for subsequent immersion in the plasticizer. An important consideration in the choice of braid-applying techniques resides in the fact that the braiding machines operate at a much slower rate than the extruders. Therefore a set-up most appropriate to a given factory's production rate will be selected.

It will be further understood that when the plasticizer dipping means for de-airing is used, the vacuum chambers and the heaters provided to aid in de-airing the various elements of the hose are optional, and are merely provided to assist the principal de-airing agent, the plasticizer in bath 19. Either or both of these vacuum and heating means may be used, at any or all of the locations disclosed, the choice of such additional means and locations for them in the process being a matter of convenience in equipment lay-out.

The hose produced by the apparatus and process of this invention has many features which are superior to those attainable with smooth-contoured hoses. The treaded outer contour provides a number of lands which make the direct contact with the ground and protect the main body of the inner core from abrasion. They also provide a protection for the braid which could otherwise be obtained only by providing an outer layer of undesirably heavy thickness and rigidity. This braid is placed radially within the outer dimensions of the raised lands, and is additionally protected by the outer layer.

The mutually-bonded relationship of the inner core, braid, and outer layer, plus the lateral support given the braid by the raised lands, assures that when the hose is flexed, the braid cannot shift to cut the outer layer free from the inner core.

In addition, it has been found that by wetting the braid with plasticizer, the braid has a tendency to indent itself into the surface of the inner core, particularly when they are heated. This tendency for indentation is noticeable even when the inner core is not caused to swell. It will be understood that a similar result could be obtained by utilizing a braid material which will shrink onto the inner core and embed itself when wetted by the plasticizer. This indentation materially reduces the shifting tendencies of the braid.

This reinforced hose has a considerably greater strength than conventional, unreinforced hose, and the .700 inch hose described within has successfully withstood pressures in excess of 600 lbs. per square inch, and has not failed at 400 lbs. per square inch. Heavier-walled tubing has been made which has withstood air pressures of 3000 lbs. per square inch.

This hose, being impermeable to fluids, may be used for air and other gases as well as liquids. It is impervious to oils, acids, and alkalies, and therefore can be used as a flexible conduit for a wide range of fluids at high pressures.

It will be understood that this invention is useful in applying braids in hoses which may have more than two plies, the number of plies and the number of braid layers being no restriction on this invention. The same techniques of dipping the braid into plasticizer and of vacuum de-airing will be useful in all cases.

It will further by appreciated that the wetting of the braid with plasticizer can be accomplished by means other than dipping the braid-covered inner core into a tank. The plasticizer might for example, be applied to the braid core while it is being applied on the inner core, or even before that time. However, the simplest, and generally the most desirable, technique is to apply the plasticizer by means of dipping as shown in the drawings.

The term "braided" as used herein with respect to the braid reinforcement will also be understood to mean "woven" or any other type of intersecting pattern of reinforcing strands.

It will further be appreciated that the hose of Figs. 1 and 2 can be produced by the machine of both Figs. 3 and 5, and that the machine of Fig. 5 can be adapted to use the wiper of Fig. 4.

Other modifications of this process will suggest themselves to persons skilled in the art. Therefore this invention is not to be limited by the embodiments shown in the drawings and described in the description, which are given by way of example and not of limitation, but only in accordance with the scope of the appended claims.

I claim:

1. A method for applying a reinforcing braid between an inner core and a concentric, contiguous outer layer of a hose, the inner core and outer layer being made of resinous material compounded with plasticizer for forming a plastic hose material, said method comprising: plaiting a braid over said inner core prior to the application of said outer layer, wetting the braid-covered inner core with a liquid plasticizer, then applying said outer layer over the braid-covered inner core, and thereafter curing the structure to form a unitary resinous hose.

2. A method for applying a reinforcing braid between an inner core and a concentric, contiguous outer layer of a hose, the inner core and outer layer being made of resinous material compounded with a plasticizer for forming a plastic hose material, said method comprising: plaiting a braid over said inner core prior to the application of said outer layer, wetting the braid-covered inner core with a liquid plasticizer, then applying said outer layer over the braid-covered inner core by applying a plastisol formulation thereto in an amount sufficient for the formation of the outer layer, and thereafter curing the structure with heat so as to form a unitary resinous hose.

3. Method according to claim 2 in which the resinous material comprises vinyl resin of a type made by polymerization of ethenoid monomers, said ethenoid monomers having the vinyl configuration as follows:

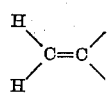

4. Method according to claim 2 in which the resinous material is selected from a group consisting of polyvinyl chloride, polymerized vinylidene chloride, polyvinyl acetate, the co-polymer of vinylchloride and vinyl acetate, the copolymer of vinylidene chloride and vinyl chloride and the copolymer of vinylidene chloride and vinyl acetate.

5. Method according to claim 2 in which the step of wetting the braid is carried out prior to the application of the braid to the inner core.

6. A method for applying a reinforcing braid between an inner core and a concentric, contiguous outer layer of a hose, the inner core and outer layer being made of resinous material compounded with a plasticizer for forming a plastic hose material, said method comprising: plaiting a braid over said inner core prior to the application of said outer layer, wetting the braid-covered inner core with a liquid plasticizer, and evacuating the region surrounding said wetted braid-covered inner core so as to aid in de-airing the core and the braid, then applying said outer layer over the braid-covered inner core by applying a plastisol formulation thereto in an amount sufficient for the formation of the outer layer, and thereafter curing the structure with heat so as to form a unitary resinous hose.

7. A method for applying a reinforcing braid between an inner core and a concentric, contiguous layer of a hose, the inner core and outer layer being made of resinous material compounded with a plasticizer for forming a plastic hose material, said method comprising: plaiting a braid over said inner core prior to the application of said outer layer, wetting the braid-covered inner core with a liquid plasticizer, and evacuating the region surrounding said wetted braid-covered inner core so as to aid in de-airing the core and the braid, and heating said braid-covered inner core so as to further aid in de-airing the core and the braid, then applying said outer layer over the braid-covered inner core by applying a plastisol formulation thereto in an amount sufficient for the formation of the outer layer, and thereafter curing the structure with heat so as to form a unitary resinous hose.

8. A method for applying a reinforcing braid between an inner core and a concentric, contiguous outer layer of a hose, the inner core and outer layer being made of resinous material compounded with a plasticizer for forming a plastic hose material, said method comprising: extruding a continuous cylindrical inner core, plaiting a braid over said inner core prior to the application of said outer layer, de-airing the braid by dipping the braid-covered inner core in a bath of liquid plasticizer, then dipping said braid-covered inner core into a bath of resin plastisol and wiping off the plastisol in excess of the amount sufficient for the formation of the outer layer and thereafter heat curing the structure so as to form a unitary resinous hose.

9. A method of manufacturing a multi layer braid reinforced plastic hose comprising the steps of: pre-heating the surface of a braid covered inner core; immersing said braid covered inner core in plastisol; passing said plastisol-covered inner core through a region of sub atmospheric pressure; re-immersing said plastisol covered inner core into a reservoir of plastisol; passing plastisol covered inner core through a wiper die to determine the thickness of an outer layer; and curing said plastisol to form an integral hose structure.

10. A method for manufacturing a multi-layer braid-reinforced plastic hose comprising the steps of: immersing a braid covered inner hose core in a liquid plastisol; passing said plastisol-covered inner core through a region of sub-atmospheric pressure; passing said plastisol-covered inner core through a wiper die to determine the thickness of an outer hose layer; and curing the plastisol remaining on the inner core after passage through said wiper die so as to form an integral hose structure comprising the inner core braid-reinforcement, and outer layer of cured plastisol.

References Cited in the file of this patent

UNITED STATES PATENTS

| 817,187 | Palmer et al. | Apr. 10, 1906 |
|---|---|---|
| 1,094,879 | Cobb | Apr. 28, 1914 |
| 1,190,292 | Hopkins | July 11, 1916 |
| 1,230,867 | Cobb | June 26, 1917 |
| 2,226,768 | Harrison | Dec. 31, 1940 |
| 2,478,940 | Pape | Aug. 16, 1949 |
| 2,491,152 | Beidle | Dec. 13, 1949 |

OTHER REFERENCES

Organic Finishing, "Dispersion Coatings," Dec. 1950, pages 11-15.